United States Patent [19]

Compagnoni

[11] Patent Number: 5,242,250

[45] Date of Patent: Sep. 7, 1993

[54] UNDERWATER BIN-FILLING PLANT

[76] Inventor: Felice Compagnoni, Via Degli Inventori, 6, 41018 San Felice Sul Panaro (Modena), Italy

[21] Appl. No.: 973,413

[22] Filed: Nov. 9, 1992

[51] Int. Cl.⁵ .................. B65G 53/40; B65G 53/44
[52] U.S. Cl. .................................. 406/73; 406/74; 406/82; 53/202; 53/536; 141/70
[58] Field of Search ............... 406/73, 74, 77–82; 53/202, 245, 536; 141/170, 171, 178

[56] References Cited

U.S. PATENT DOCUMENTS 3,097,460 7/1963 O'Brien ..................... 53/536 X

Primary Examiner—David M. Mitchell
Assistant Examiner—James M. Kannofsky
Attorney, Agent, or Firm—Browdy and Neimark

[57] ABSTRACT

The plant, which is used in the working of fruits such as applies and similar, collects the fruits (9) from water conveyor channels (6), and inserts them below a bell (3), from which the fruit will successively be transferred, by force of gravity, inside container bins (1); the bell (3), apart from being capable of axial movement, is capable also of translation movement which allows it to be positioned over various transport channels, with which a plant is usually equipped; the bell (3) further comprises an aspiration pump (10) which creates a vacuum inside it, so as to favor the accumulation of fruit inside the bell (3).

3 Claims, 4 Drawing Sheets

UNDERWATER BIN-FILLING PLANT

BACKGROUND OF THE INVENTION

The invention relates to an underwater bin-filling plant.

Plants of the kind in object are used in harvest collection and sorting centres. The fruit worked in such plants are generally constituted by apples, oranges and similar.

In fruit collection centres, the fruit arriving from the fields is tipped on to sorting lines on which the fruit is selected according to size and characteristics, unsuitable fruit being eliminated. Then fruit of one type (of the same size) is placed in large bins in order to be sent for distribution or conservation.

In the collection centres, the fruit is transported by means of transport channels on which the fruit floats and is carried to a removal zone; these plants generally have a considerable number of transport channels, each of which conveys fruit of different characteristics which are to be placed in different bins.

In the prior art, a bell is envisaged at the removal area, which bell's open end is immersed in water; under the bell there is an empty bin which is also immersed in water. Using transport means of known type and generally constituted by bucket conveyors or the like, the fruit is removed at the removal zone and conveyed downwards below the free surface of the water, and inserted, still under water, inside the bell. The fruit floats in the water contained in the bell; once there is the desired quantity of fruit inside the bell, the bin positioned under the bell is raised and in its upcoming movement raises also the bell; when the bin has emerged from the water, the bell, which at this point is above the bin, unloads its fruits into the bin. By means of pushing means the bin, unhindered by the bell, which is held up by special hooks, is substituted with an empty bin. The empty bin is hooked to the bell and the entirety is re-immersed in the water ready for a new filling phase.

In prior art plants, with the aim of preventing the fruit transport means from interfering with the bin or with the bell wall, the bells are inferiorly equipped with a one-way "Clapet" hatch that opens during the insertion phase of the fruit into the bell and closes during the raising phase of the bell. Further, to permit the introduction of a considerable quantity of fruit into the bell, the bell itself must be immersed up to a considerable depth in the water; this brings about the need to bore deeply into the factory floor at the part where the bell is located, so as to enable the bin to be contained when it is in the completely lowered position. Instead of boring deep holes in the floor, the problem is often solved by raising the entire removal zone. This however leads to considerable complications during the construction of the plant. In prior art plants, even if several conveyor channels arrive at the removal zone, which on command unload their fruit which is then directed under the bell, it is still necessary to provide several bells and several feeding systems for the bins; this obviously leads to an increase in the costs of the plant itself.

SUMMARY OF THE INVENTION

An aim of the present invention is to eliminate the above-mentioned drawbacks by providing a filling plant which does not require sinking of bore holes or raising of the removal zones and which leads to cost reductions with respect to prior art plants of equal potentialities.

One advantage of the plant is represented by its extreme functional versatility.

A further advantage of the plant is represented by its operating speed.

Yet another advantage, with respect to prior art plants, is represented by the considerable water and energy savings, thus leading to a reduction in costs.

These aims and advantages and others besides are all attained by the filling plant object of the present invention, as it is characterised in the claims that follow, which filling plant collects the fruit from the conveyor channels and inserts them under a bell, from which the fruit will then be transferred by force of gravity into container bins; the bell, apart from being equipped with an axial movement, is further capable of a translation movement which allows it to be positioned at the various transport channels which normally equip a plant; the bell further comprises means of aspiration which create a vacuum inside the bell so as to favor the accumulation of the fruit inside the bell itself.

BRIEF DESCRIPTION OF THE DRAWINGS

Further advantages and characteristics of the present invention will better emerge from the detailed description that follows, made with reference to the accompanying drawings, which represent a preferred embodiment here illustrated in the form of a non-limiting example, and in which.

DESCRIPTION OF THE PREFERRED EMBODIMENTS

Figure 1:
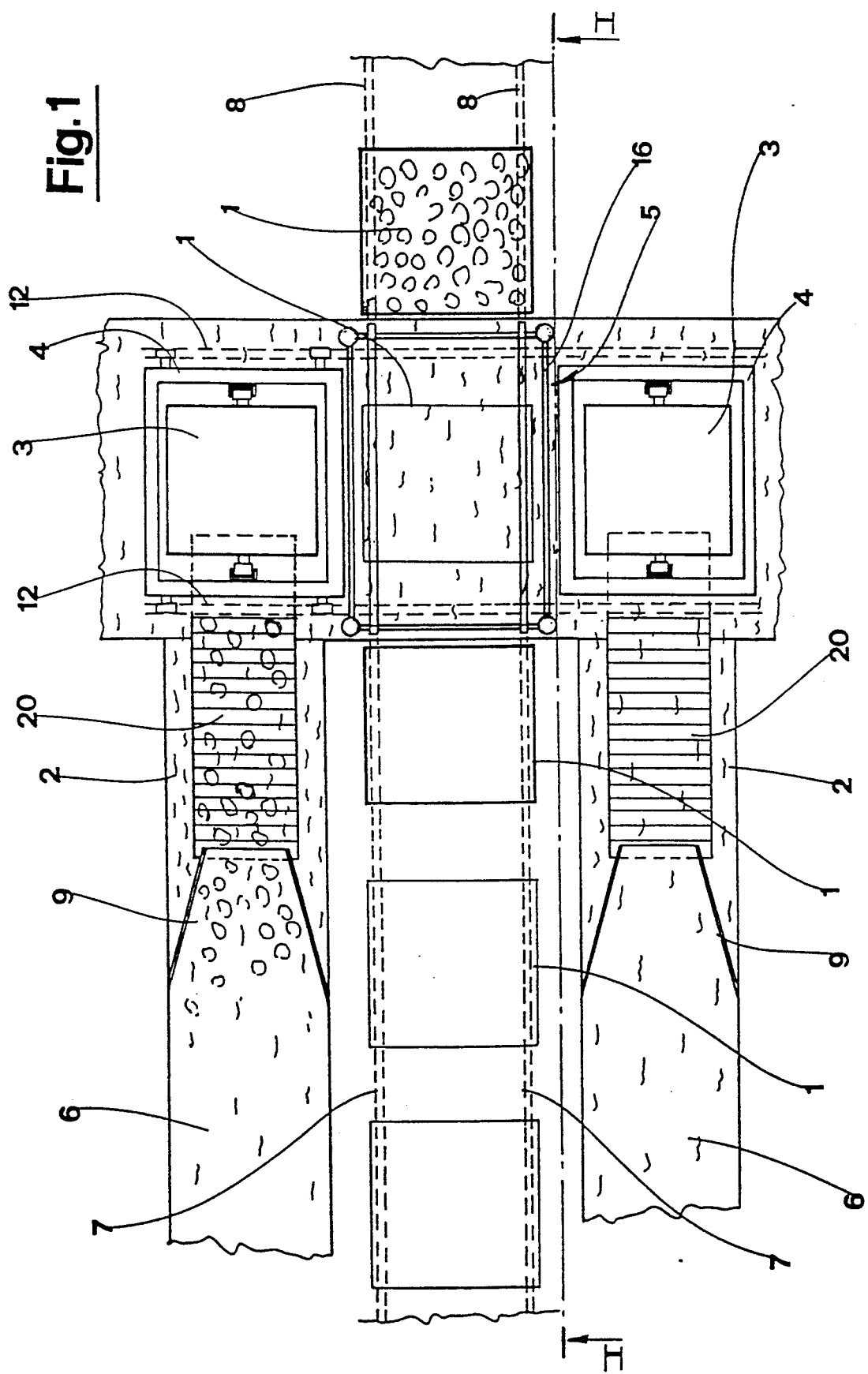
FIG. 1 shows a schematic view from above of a possible embodiment of the plant of the invention.
Figure 2:
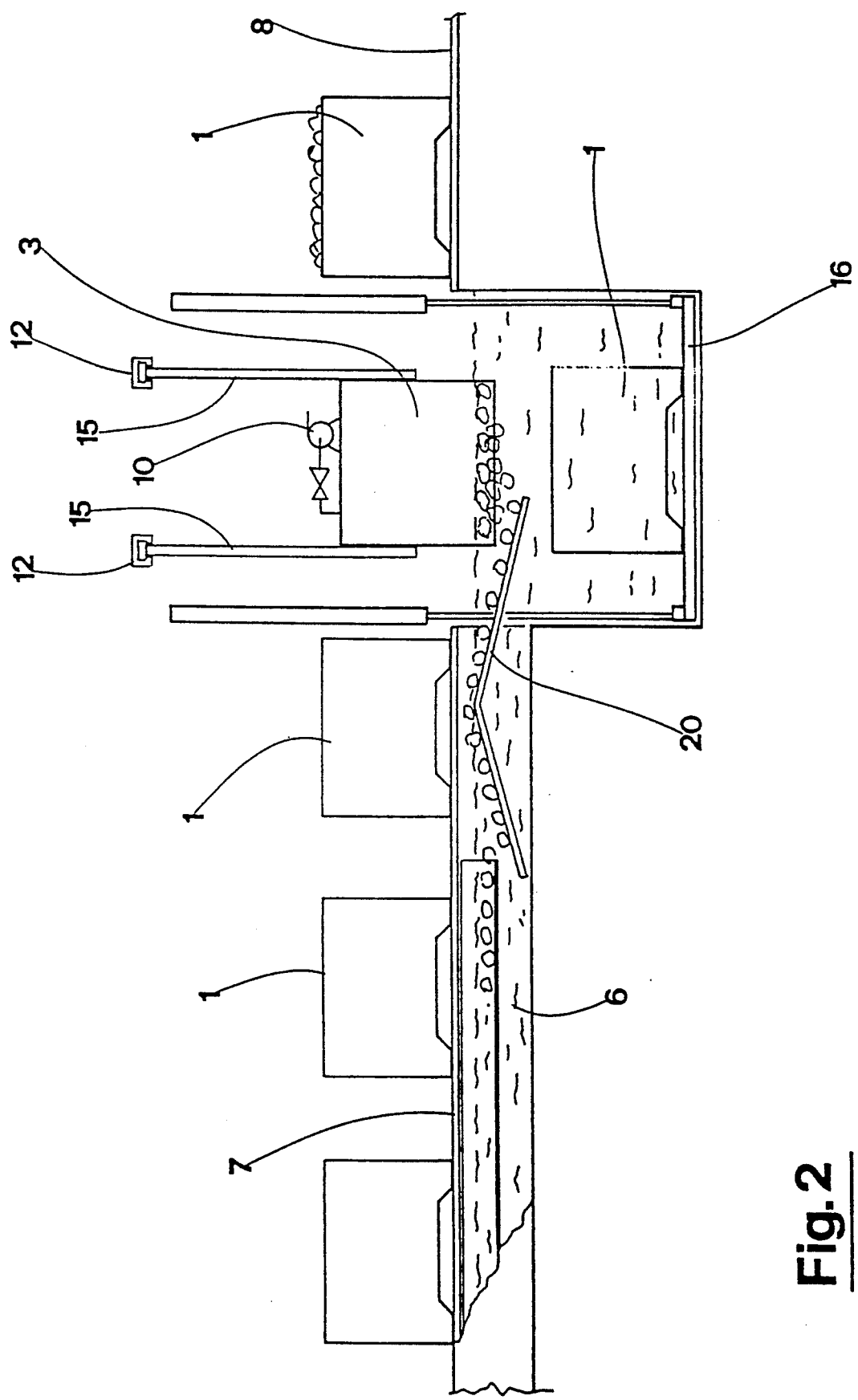
FIG. 2 shows a partial schematic vertical-elevation section of the plant along section line I—I of FIG. 1.
Figure 3:
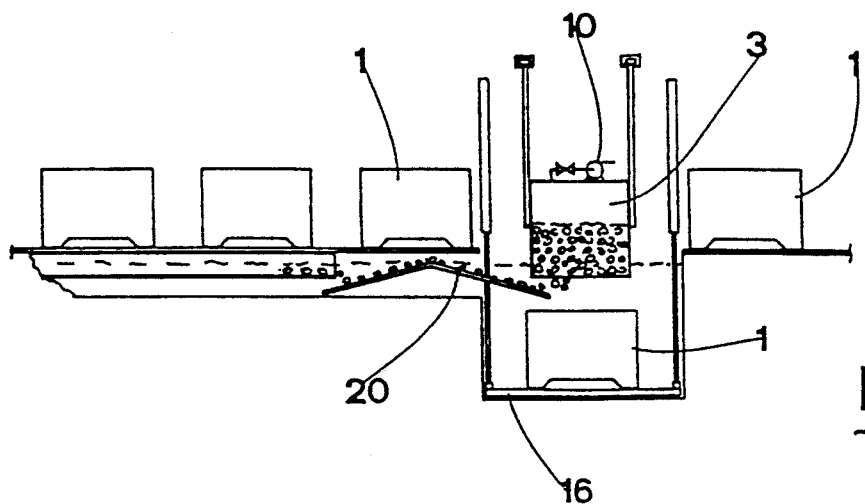
FIGS. 3 to 7 schematically represent the successive operative phases of the plant.
Figure 4:
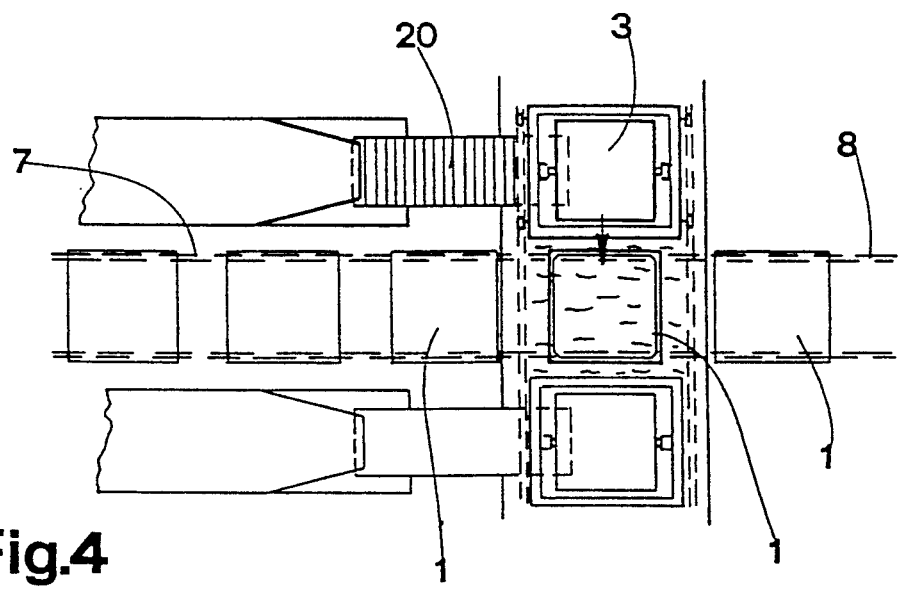
Figure 5:
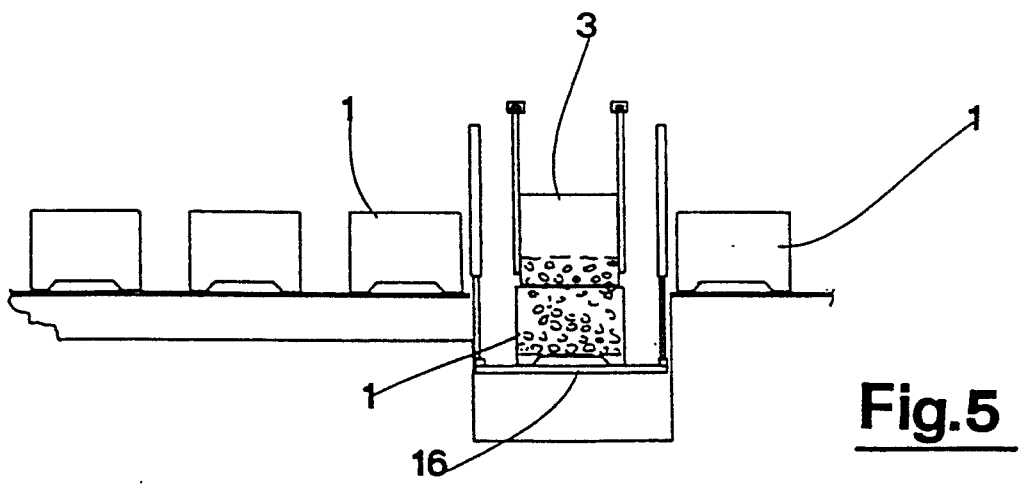
Figure 6:
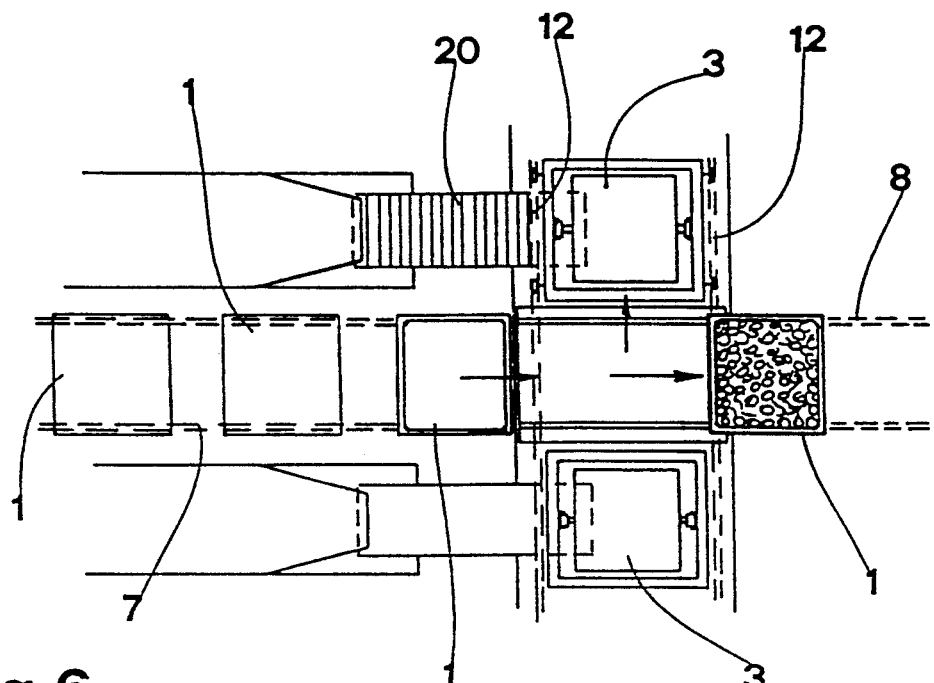
Figure 7:
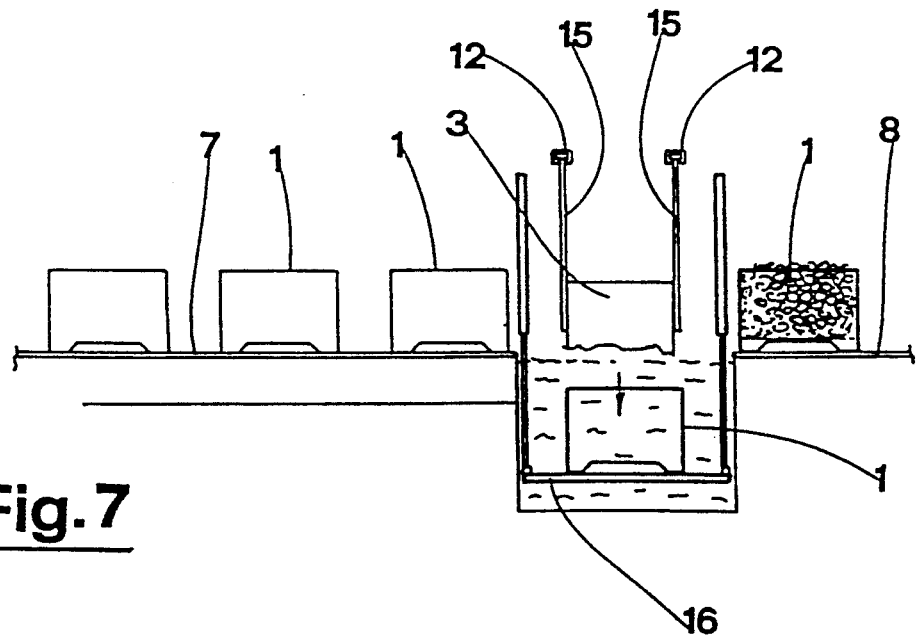

With reference to the figures, the plant comprises a plurality of conveyor channels 6 arranged parallel to each other and full of water; the conveyor channels 6, by means of movement of the water contained in them, transport the fruit 9 to a collection zone 2 arranged at one end of the conveyor channels 6.

A water well 4 is envisaged, behind the collection zone and arranged perpendicularly to the conveyor channels 6. By the side of the conveyor channels 6 and parallel to them is a loading conveyor 7 which transports empty bins 1: the loading conveyor 7 reaches the water well 4 at a loading zone 5 of the empty bins 1. On the opposite side of the loading zone 5 with respect to the loading conveyor 7, a bin unloading conveyor 8 is envisaged; the loading zone 5 thus functions as a loading zone for empty bins and an unloading zone for full bins.

The loading and unloading planes of the loading conveyor 7 and the unloading conveyor 8 are located at a higher level than the free surface level of the water.

Raising means are envisaged in the loading zone 5, which means comprise a frame 16, arranged parallel to the free surface of the water, which frame 16 is raised and lowered by means of hydraulic jacks; during the empty bin loading phase and the full bin unloading phase, which phase is performed by means of pushing means of known type, the loading plane of the frame 16 is arranged at the same level as the loading planes of the loading conveyor 7 and the unloading conveyor 8.

The plant comprises at least one bell 3 arranged over the water well 4 with its axis perpendicular to the water well 4 itself and which can be moved axially, along a system of vertical guides 15 in which a plurality of sliding elements solid to the bell 3 are constrained to move, in such a way that the open end of the said bell 3 is brought, according to the various operative phases of the plant, which will be more fully described below, above or below the free surface level of the water; the bell 3 is substantially perpendicular prism-shaped and exhibits a base that, for reasons that will better emerge hereinunder, is superimposable on the base of the bins 1.

Transport means are also envisaged, usually constituted by bucket conveyors 20 and in any case by known type conveyors, which take the fruit from the collection zone and insert it, by immersing it in the water, under the bell 3 when the bell 3 open end is below the free surface of the water.

Aspirating means, which comprise a pump 10, are positioned on the bell 3, which aspirating means on command aspirate the air from the inside of the bell 3.

The bell 3 can be moved along the water well 4 so as to be positioned, on command, at a collection zone or at a loading zone; in order to allow such movement the vertical guide system which supports the bell 3 is anchored to horizontal guides 12 arranged above the water well 4.

The plant of the invention is completely automatized and is equipped with command means, of electronic type and in any case of known type, which allow the plant itself to function according to successive operative phases which will be described below.

The operation starts from a situation in which a bell 3 is in proximity to a collection zone, with its free end slightly below the free surface level of the water and where a bin 1 is sunk below the water surface level in the loading zone; the frame 16 of the lifting means is obviously below the bin 1. Also obviously, empty bins 1 are positioned on the loading conveyor 7.

The transport means begin to collect fruit from the collection zone and to bring them to a position below the bell 3; contemporaneously the pump 10 begins to aspirate air from the inside of the bell 3. Following the depression which is created internally to the bell 3, the water level inside the bell 3 rises with respect to the free surface level; therefore also the fruit, which is floating on the water, rises internally to the bell 3. It is thus possible to obtain quite a thick layer of fruit without having to immerse the open end of the bell 3 to a great depth below the surface of the water; the immersion of the free end of the bell 3 under the said free water surface serves only to create a seal against the outside; the immersion could thus be restricted to only a very limited depth.

Once the desired quantity of fruit has been inserted under the bell 3, the bell 3 itself is moved along the horizontal guides 12 up until it arrives in the loading zone superior to the immersed bin 1. By raising the frame 16 by means of the lifting means, the bin 1 rises, meets the end of the bell 3 and pushes the bell 3 upwards, which bell 3 slides along its vertical guides 15; contemporaneously a breather pipe on the bell 3 is opened so as to allow air to enter into the bell 3 itself. Following the raising of the bell 3, but especially following the entrance of the air into the bell 3, which brings the liquid level inside the bell 3 back to the free surface level of the water in the water well 4, the fruit contained in the bell 3 is deposited inside the bin 1. The lifting stops when the frame 16 plane is at the same level as the loading planes of the conveyors 7 and 8; in the said situation, the bin, and consequently also the bell 3, are completely above the free surface of the water.

A further small lifting of the frame 16 is effected, as normally happens in known art plants, so as further to lift the bell 3 up until it reaches hooking means which make the bell 3 solid with the vertical guides 15, and which free the bell 3 from the bin 1; successively, an analogous movement of the bin 1 in a contrary direction is made so that it is brought back into the preceding position.

At this point, while the bell 3 is newly made to slide along the horizontal guides to bring it back in proximity to a collection zone and to put it back into a position to receive fruit, the pushing means push an empty bin 1 on to the frame 16; the empty bin 1 causes the expulsion of the full bin 1 from the frame 16, which full bin 1 is then carried away from the plant.

At this point the frame 16 is lowered until it brings the empty bin 1 into a completely immersed position and the cycle recommences; hooking devices of known type are envisaged between the frame 16 and the bin 1 in order to prevent the bin 1 from floating in the water.

It should be noted that the fact that it is possible to immerse the bell 3 up to only a very small depth below the free surface of the water permits the unproblematic horizontal movement of the bell 3 along the water well, which was not possible, or at least was very problematic in plants of known type.

In the plant illustrated in the figures, two tanks are indicated, between which is positioned a line for loading and unloading the bins 1; two bells 3 are also indicated, which, alternatively, are brought into the collection zone of the relative channel or into the loading and unloading zones of the bins 1, each repeating the above-described phases; this considerably increases the operative speed of the plant since the filling phase of the bells 3, which is halved, is the phase requiring the most time. It is also evident that, given the ability of the bell 3 to move along the water well, each bell 3 can be used to operate on numerous tanks situated side-by-side.

It is also obviously possible to realise complex plants, equipped with various bin loading and unloading zones, with bins arriving which receive fruit each of numerous tanks; this is because the operative process of the various elements composing the plant allow considerable possibility of choice in the design of the plants themselves.

Finally it is specified that all of the mechanical devices, such as conveyors, lifters, stops, guides etc. have not been described in detail herein since they are all of known type and can be differently conformed; the plant's novelty does not lie in the particular conformation of the said devices, but in their special combination and interaction.

What is claimed:

1. An underwater bin-filling for filling bins with fruit comprising: a plurality of conveyor channels to transport the fruit into one or more collection zones; at least one bell, arranged above a water well, the at least one bell having an open end parallel to a free water surface of the water in the water well; the at least one bell having means for moving the at least one bell axially, said means for moving being a means for positioning the open end of said at least one bell, according to various operative phases of the plant, below or above the free water surface of the water well; means for collecting and transporting the fruit from the one or more collection zones for inserting the fruit under the at least one bell, when the open end of the at least one bell is below the free surface of the water; wherein, the water well is arranged perpendicularly to the conveyor channels and adjacent to the one or more collection zones; at least one zone for loading empty bins and for unloading full bins on the water well, loading and unloading conveyors, respectively, for the empty and full bins positioned by sides of the at least one zone for loading and unloading, the loading and unloading conveyors having loading and unloading planes that are at a higher level than the free water surface level; lifting means arranged in the at least one zone for loading and unloading for moving said empty bins from a position above the free surface of the water to a position below the free surface of the water; pushing means arranged for pushing each empty bin on to said lifting means; and the at least one bell is equipped with a means for moving the at least one bell along the water well and for positioning the at least one bell, on command, in one of said one or more collection zones or in the at least one zone for loading and unloading.

2. A plant as in claim 1, further comprising aspirating means to aspirate, on command, the air from the inside of the said at least one bell.

3. A plant as in claim 2, further comprising command means for successively imposing cyclic operations on the at least one bell, the loading and unloading conveyors, the lifting means, the pushing means, the means for moving the at least one bell along the well and for positioning the at least one bell and the aspirating means wherein said loading conveyor and said pushing means are a means for positioning said empty bins on the lifting means, arranged above the free surface of the water, and the means for moving the at least one bell along the well and for positioning the at least one bell is a means for contemporaneously positioning the at least one bell, with its open end arranged slightly below the said free surface of the water, at said one or more collection zones; wherein said lifting means is a means for completely immersing the empty bin in the water in the well, the means for collecting, transporting and inserting are a means for contemporaneously introducing the fruit under the at least one bell, and said aspirating means is a means for contemporaneously aspirating air from the at least one bell, up until the quantity of fruit desired has been introduced; wherein the means for moving the at least one bell along the well and for positioning the at least one bell is a means for moving the at least one bell to above the at least one zone for loading and unloading: wherein the lifting means is a means for raising the immersed bin and the above-lying at least one bell, and said aspirating means is a means for contemporaneously introducing air into the at least one bell, up until the said bin is above the free surface level of the water and is full; and wherein the pushing means is a means for pushing one of said empty bins on to the lifting means and for pushing the full bin on to the unloading conveyor, and the means for moving said at least one bell along the well and for positioning the at least one bell is a means for contemporaneously translating the at least one bell to said one or more collection zones.

* * * * *